United States Patent [19]

Helbig et al.

[11] Patent Number: 5,673,258
[45] Date of Patent: Sep. 30, 1997

[54] METHOD AND APPARATUS FOR THE ENLARGEMENT OF THE REACH OF THE TRANSMISSION CHANNEL BETWEEN FUNCTIONAL GROUPS OF AN ISDN-USER INTERFACE

[75] Inventors: Klaus Helbig, Berlin; Roland Geissler, Dresden; Norbert Wulst, Bischofswerda, all of Germany

[73] Assignee: DTM Data TeleMark GmbH, Berlin, Germany

[21] Appl. No.: 398,446

[22] Filed: Mar. 3, 1995

[30] Foreign Application Priority Data

Mar. 6, 1994 [DE] Germany ............. 44 07 214.7
Mar. 1, 1995 [DE] Germany ............. 195 06 906.4
Mar. 2, 1995 [DE] Germany ......... PCT/DE95/00268

[51] Int. Cl.$^6$ ................. H04J 3/06; H04J 3/12
[52] U.S. Cl. ................ 370/293; 370/503; 370/522; 370/904
[58] Field of Search .................. 370/58.2, 68.1, 370/85.13, 99, 105.2, 60, 110.1, 271, 293, 282, 283, 476, 501, 502, 503, 505, 522, 524, 904

[56] References Cited

U.S. PATENT DOCUMENTS 5,412,660  5/1995  Chen et al. ................. 370/110

FOREIGN PATENT DOCUMENTS 30 28 155 C2   7/1980  Germany.
3431 423 A1    8/1984  Germany.
39 15043 A1    5/1989  Germany.
41 41 725 A1  12/1991  Germany.
2 249 927      5/1992  United Kingdom.

OTHER PUBLICATIONS

International Conference on Communications, Including Supercomm Technical Sessions Atlanta, Apr. 15–19, 1990; Bd. 4 04 4, 15.Apr. 1990 Intstitute of Electrical and Electronics Engineers, Seiten 1637–1642 XP 000146059 Tzung-Pao Lin 'Residential ISDN Services: Information Service Architecture.

ICC'84 Links for the Future, Bd. 2. 14 Mai 1984 Amsterdam, NL, A. Termote et al. ISDN Field Trial in the Belgian Network siehe Seite 880–Seite 881; Abbildungen 3–6.

Bell Laboratories Technical Journal, Bd. 63, Nr. 10–2, Dec. 1984 Seiten 2283–2331 M.M. Luniewicz et al. The SLC 96 Subscriber Loop carrier System: Channel Bank.

Siemens Components, Bd. 22, Nr. 2, Apr. 1987 Munchen DE, Seiten 65–69, B. Muller Communications Devices Cope with Digital Transmission seihe Abbildungen 2, 4, 5.

Primary Examiner—Douglas W. Olms
Assistant Examiner—Matthew C. Phillips
Attorney, Agent, or Firm—Griffin, Butler Whisenhunt & Kurtossy

[57] ABSTRACT

One, or more, ISDN interfaces have their reach extended without violating ISDN interface standards by a method which converts ISDN coded information which is to be delivered over an extended channel into binary coded data prior to transmission, transmitting the binary coded information to a receiver at an extended location and there, after storage, and assembly, converting the binary coded data into ISDN specific coded data for delivery to an ISDN interface.

20 Claims, 3 Drawing Sheets

METHOD AND APPARATUS FOR THE ENLARGEMENT OF THE REACH OF THE TRANSMISSION CHANNEL BETWEEN FUNCTIONAL GROUPS OF AN ISDN-USER INTERFACE

FIELD OF THE INVENTION

The invention relates to a method and apparatus for the enlargement of the reach of the transmission channel between functional groups of an ISDN-User interface with reference to one or more equivalent ISDN interfaces, as they are for example standardized according to CCITT I.400—ISDN user network interface and I.430—basic user network interface. With this invention it is possible to transmit the many faceted ISDN services over great distances.

BACKGROUND AND OBJECTS OF THE INVENTION

The ISDN (Integrated Services Digital Network), which allows, in addition to speech transmission, the rapid transmission of data, text, and pictures also allows for the possibility of the connection of NT and TE apparatus, as well as other distribution nets.

For the functional separation of the elements which are used in a ISDN user interface, it is useful to consider the reference configuration with the CCITT. FIG. 3 shows the reference configuration for the ISDN-user interface with the reference points R, S, T, U and V.

The functional units in accordance with FIG. 3 describe each unit:

| | |
|---|---|
| ET, exchange termination: | transfer point of the net which transmits a user signaling identity to the net side; |
| LT, line termination: | line termination which terminates the transfer on the net side of the connection from the transfer point to the user interface. It is sometimes regarded as part of the ET exchange termination and not specifically represented. |
| NT 1, network termination 1: | this is the termination from LT to the user interface, can be controlled by the network provider and isolates the end system connection from the transmission technology of the user interface. |
| NT 2, network termination 2: | if present, the conveyance, i.e. concentration function in the realization of a PBX private branch exchange. |
| TE 1, terminal equipment type 1: | corresponds to the ISDN interfaces and works directly with NT 1, or NT 2. |
| TE 2, terminal equipment type 2: | is a conventional end apparatus with an analog interface and for the feeding from the ISDN a terminal adaptor, TA is necessary to establish the access to the ISDN. |

This use reference configuration identifies the necessary functions independently of technical details and establishes their relative position to one another.

Between these functional groups, certain reference points are defined, which separate the functional groups from one another. The reference point V is located between the conveyance point and connection termination, the reference point U is located between line termination and network termination, the reference point T is located between network termination 1 and 2, the reference point S is located between network termination and an end system type 1 and the reference point R is located between the terminal adaptor TA and an end system type 2. For the reference point U national standards exist and for the reference points S and T there are international standards.

At the interfaces of the ISDN user interface there is a multiplicity of functions which have to be realized. An $S_0$—interface, for example, must fulfill the following functions:

For each transmission direction 2 lines (copper);

A gross transmission rate of the AMI coded signals in each direction of 192 Kbit/s;

A net data rate (2B channels plus 1D channel) which equals 144 Kbit/s (48 Kbit/s for synchronization and control);

Step timing: derived from the bit stream which occurs at 192 Kbit/s;

Octet timing: derived from 192 Kbit/s which equals 8 kHz (for speech coding);

Frame synchronization: realized through deliberate code violations for purposes of recovery of the time division channels;

D/echo channel: serves the orderly attachment of the TE device to the D channel;

Activation and de-activation (the changeover between utilization and rest conditions).

Frame build-up and coding of the transmitted bytes are subject to a rigorous rule. In accordance with the rules of the HDLC, the information to be transported is built in to one or more frames which always begin and end with a special bit sequence. According to established rules, procedures such as frame synchronization, super frame control, connection control, remote feed, and activation and de-activation are realized.

Regardless of a net side connection of ISDN terminal equipment or network terminations it is an advantage to extend the reach of the transmission channel between functional groups of the ISDN participant connection (with reference to one or more ISDN basic connections $S_0$, or other interfaces), to transmit the information from a net over a longer distance. However, the achievable reach with conventional apparatus is significantly restricted because of the electrical properties of the ISDN interfaces and connection ways. For example, heretofore, it has not been possible to drive a $S_0$ interface over more than 1000 m (point to point connection) or an $U_{ko}$ interface without intervening connections of amplifiers, over more than 6 kilometers. That means that the reach of the transmission way between functional groups of the ISDN user interface to one or more ISDN interfaces is limited.

In accordance with standard CCITT I.400 the signal travel (signal delay) time, for example between the functional units NT and TE, and back, is standardized between a minimum of 10 microseconds and a maximum of 14 microseconds. This is primarily caused by the 2-bit frame shift which is necessary for time recovery (frame shift equals code displacement as a signal for the beginning of a frame).

To detect a collision, the frame beginning (2-bit) must be detected within 70% of the signal transfer time period.

For 2-bits this equals 10.416666 microseconds and, with return answer, equals 3.6458331 microseconds.

Under the assumption of a wave attenuation of 7.6 dB per kilometer (for copper) the signal transfer time delay T=9 microseconds per km. From this relationship, $$l \leq \frac{t(\text{roundtrip})/2}{T} = \frac{3.6\,\mu s/2}{9\,\mu s/km} = 0.2\,km$$

one can determine the maximum extension of the $S_0$ connection. This calculation is valid for case of point to many point configurations. The calculation for the point-to-point configuration (no collision recognition) analogously yields 1 kilometer.

The time relationships for the transmission over a satellite channel with regard to the collision recognition are not changed. However, the signal delay with a connection over a geo-stationary satellite (the distance being approximately 36,000 km) is significantly changed. In one direction the signal delay amounts to 220 milliseconds, and with return answer 440 milliseconds. These time relationships show that one cannot achieve in this fashion a direct extension of the reach of the transmission channel between functional groups of the ISDN user interface from a basic $S_0$ connection.

Thus, it is an object of the invention to provide a method and apparatus which allow the enlargement of the reach of the transmission channel between functional groups of the ISDN user interface. This is achieved by the conformance to all ISDN typical characteristics, such as:

maintenance of system timing;
multiple access to the interface bus;
Activation and de-activation of the interface.

In accordance with the invention, the object of the enlargement of the reach of the transmission channel between functional groups of the ISDN user interface, with reference to one or more of similar ISDN interfaces n is solved by a process in which:

a) the data transmission from the net occurs in such a fashion that the ISDN specifically coded data arriving at the particular ISDN interfaces are converted with a code converter into binary coded data, separated in accordance with B and D channel information; and b) forming, byway of a storage device, blocks in the B and D channels (enhanced with a marker for the particular interface) and transmitting by transmission means within fixed time intervals (derived from the ISDN specific timing) to a receiver side the data with a bit timing determined either from an independently produced timing signal or a timing signal derived from the ISDN specific timing; and c) providing at the receiving points of the terminals an ISDN specific timing recovery (necessary for the communication between sender and receiver) which is derived either from the time spacing of the received data blocks or the time spaced arrival of the transmitted data bits; and d) storing the received blocks, in accordance with their markers, in a storage device, adapted to the particular ISDN interface and for transmission thereto, and the B channel information and the D channel information (insofar as present) is provided to a code converter in accordance with the derived timing and e) data transmission from the terminal side takes place in accordance with process steps a), b), wherein the ISDN specific timing described in process step b) is that timing which is recovered in process step c); and f) storing the received data blocks received at the net side in a memory in accordance with its marker and recovering the data by way of a code converter in accordance with the ISDN specific timing at the net side.

Preferably, block formation in accordance with step b) of the process occurs in such a way that the blocks have equal length and the proportioning of the B channel and D channel data occurs in accordance with the relationship of the capacity of the B and D channels of an ISDN interface.

For those times in which the D channel carries no information, the block formation occurs in equal length without D channel data.

For those times, in which the ISDN interface n is not active, block formation occurs in such a fashion that equal length blocks of a fixed length are formed. These blocks carry no relevant information as they serve only for the maintenance of the communication ability between net and terminal side.

An active intervention in the D channel signalization occurs for those cases in which the signal delay of the D channel signalization is too large for the utilized transmission channel. In these cases, the activating participant is advised that the connection has not been established.

The length of the blocks built in accordance with process step b) is dependent on the capacity of the processing units required for the coding, transmission, and uncoding of the ISDN interface information as well as the ISDN specific channel capacities.

The blocks formed at the receiver side are bit timed either with an independently produced timing signal or with a timing signal derived from the ISDN specific timing for transmission over transmission over satellite or other transmission channels.

In accordance with CCITT I.400, to ensure the accurate distinction of the flags (0111110) in the transmission of the information bytes in the blocks, a "0" is inserted in the bit stream wherever more than 5 "ones" follow successively. As a result, the real necessary bit rate increases. To reduce the probability for this occurrence, preferably the blocks are connected with an exclusive OR before and after transmission. For this purpose pre-defined bytes, with changing bit value, are used.

Timing recovery in accordance with step c) of the process, when the transmission system determines the transmission timing, occurs in such a form that a comparison timing is derived from the time-spaced arrival of the received data blocks, from which, in accordance with known principles, a base timing is produced in a phase locked loop (PLL) from which the timing for the ISDN n interfaces is provided on the terminal side.

When the bit timing for the transmission system can be provided with a process in accordance to the invention, this base timing for the ISDN interfaces is preferably derived from the bit transmission rate byway of a PLL.

Both the terminal and net side code conversion of the ISDN-specific coded data into binary form occurs through known principles by way of a code converter, preferably an ISDN subscriber access controller.

In accordance with the invention, the realization of the process for the enlargement of the reach of the transmission channel between functional entities of several ISDN user interface occurs through an arrangement which comprises on both terminal and net sides an arrangement for protocol conversion and means appropriate for the transmission channel.

The transmission channel comprises transmission arrangements which are per se known and which are adapted to the medium utilized, for example a satellite channel with the appropriate sending and receiving arrangements as well as the required modems.

The arrangements for protocol conversion communicate with one another over the particular transmission channel and are preferably formed in the same way and can function both in master mode as well as slave mode wherein the arrangement connected to the net side functions in master mode and the arrangement on the terminal side functions in slave mode. But it is also possible to achieve the arrangement of a protocol converter exclusively in master or slave mode wherein an arrangement at the net side comprises an arrangement working in master mode and the arrangement on the terminal side functions in slave mode.

The assembly for protocol conversion consists essentially of:

A number of interface modules (1) corresponding to the number n of the ISDN interfaces to be connected A microcomputer (66), and An interface module (2) for the transmission channel X A module for timing (3)

One PIO (92),

A mode switch (5)

A power supply (4)

as well as the corresponding electrical connections and a bus for the address and data exchange.

The microcomputer 66 is connected over a bus b with the ISDN interface modules 1, and over the bus b, with the parallel input-output-building block PIO 92 as well as with the interface module 2 for the connection to the transmission channel X.

The module (3) for timing generation is connected, via bus b, with the interface module 1 and with the interface module 2 for the connection to the transmission channel X as well as with the PIO block 92 with microcomputer 66.

The switch 5 for the mode setting (master/slave) functions on power supply 4, on the interface module 1 and on the module 3 for timing generation.

The power supply 4 supplies a switch with voltage and produces, when the protocol converter works in slave mode, the supply voltage for the terminal equipment which is independent of the net.

Every ISDN interface module 1 converts the ISDN interface into a binary coded form. The binary data as well as the required control information are exchanged, via bus b, between the interface module 1, the microcomputer 66, the PIO 92 and the interface module 2. The interface module 1 is comprised on an ISDN interface and a circuit for the conversion of the ISDN-specifically coded data into binary data, for example an ISDN-subscriber access controller. The interface module 2 for the transmission on the X channel comprises a interface and a serial input-output building block SIO.

The microcomputer 66 comprises a microprocessor, a ROM for the storage of the program code, a RAM as working memory and a bus. The microcomputer 66 is connected with the parallel input-output block PIO 92 and with the ISAC circuit in interface module 1 as well with the serial input-output building block SIO over a bus. The processor in microcomputer 66 controls the function of the building blocks PIO 92, the ISAC circuit in interface module 1 and SIO in interface module 2 in a known manner through appropriate adjustment of the registers provided therefor in these building blocks.

In case of the realization of the arrangements for protocol conversion exclusively in slave or in master mode, these elements consist of almost the same building blocks as described above. The switch for mode selection 5 is eliminated. The other building blocks are switched so that they achieve the functions in slave, or, master mode as described above.

On the net side the system for protocol conversion functions in master mode as follows:

in the interface module 1 there is a conversion of the signal levels existing at the ISDN interface to the signal levels required by the ISAC circuit.

The mode switch 5 switches the ISAC building blocks in all interface modules 1 into the TE mode-terminal mode. In such a mode the ISAC produces a timing signal of 512 kHz at the output DCL. When the ISDN interface is active, the timing signal of 512 kHz is synchronously derived from the bit timing of the ISDN interface.

The timing signal of 512 kHz of every interface module is transmitted to the module 3 for timing signal generation. The processor of the microprocessor 66 designates the lowest logical address in the interface module which corresponds to the ISDN interface which is active. The timing signal of 512 kHz of the ISAC circuit of exactly this ISDN interface is used in the module 3 for timing generation timing module (all as controlled by the processor in microcomputer 66, to produce a symmetrical timing signal). Such timing signal is provided to a port of the PIO 92 of the microcomputer 66.

The ISAC circuit in the particular interface module 1 converts the ternary coded B and D channel signals of an ISDN interface, insofar as it is active, into binary coded signals and stores these, by byte, in its registers. In reverse, the circuit converts the binary coded B and D channel data from the processor into ternary signals and transmits these data to the interface of the corresponding interface module 1 for transmission to the ISDN interface n.

The ISAC circuit signals, through a register, that it is prepared for the reception of new B1 and B2 channel bytes and, simultaneously, for a complete B1 and B2 channel byte, through the processing microcomputer 66. The processor in microcomputer 66 periodically interrogates the signal register of the ISAC circuit and accepts, or transmits, the completed B channel bytes in its working memory.

Through a further register, the ISAC circuit also signals when a D channel frame from a particular ISDN interface has been received. The processor in microcomputer 66 also interrogates this register periodically and reads the signal bytes and receives, in the appropriate case, the D channel frames in its working memory.

When the processor in microcomputer 66 has received a D channel frame, it, in turn, transmits these bytes to the ISAC circuit for further delivery to the ISDN interface.

From the bytes transmitted from the ISAC circuit the processor forms blocks and stores these in the RAM of microcomputer 66 in the interim.

The processor in microcomputer 66 will always receive an interrupt signal from the PIO 92 when the signal levels change upon receipt of the timing signal. At every such signal, the first part of a new block is delivered to the SIO in the interface module 2 and a control register is set in the SIO to make this building block responsible to commence the transmission of this block. The SIO designates in its register, when the next portion of the block has to be delivered so that the delivery is not interrupted. The processor in microcomputer 66 interrogates this register repeatedly and delivers to the SIO in interface module 2 the corresponding further portions of the block.

The processor delivers to the SIO in interface module 2 successively received data blocks corresponding to the cyclically repeated logical addresses of the ISDN interfaces n. All ISDN interfaces operate synchronously on the basis of the central system timing of the ISDN so that the blocks are also produced synchronously.

In the reverse direction, the SIO in the interface module 2 receives data bit serially over the interface in interface module 2. When the first portion of a new block or a further portion of a block is received in the SIO, appropriate signalization bites are set in a register in the SIO. The processor of the microcomputer 66 periodically interrogates this register. When the receipt of a block is indicated, the processor receives this block in its working memory RAM. The blocks are stored in accordance with the logical address stored in the control bytes. Several recently received blocks are stored in accordance with the logical address.

Internal registers within the SIO in interface module 2 signal that a B channel byte is to be delivered to the ISAC circuit for transmission to the ISDN interface n. The processor of microcomputer 66 interrogates these registers of all ISAC circuits repeatedly and delivers the corresponding B bytes to the relevant ISAC circuit.

The D channel bytes of the blocks received in interface module 2 are delivered to the known D channel registers in the ISAC circuit in interface module 1.

On the terminal side, the arrangement for protocol conversion in slave mode functions as follows:

in the interface module 1 a conversion occurs at the interface from the signal levels of the respective ISDN interfaces n to the signal levels required by the ISAC circuits.

The ISAC circuits in interface module 1 is switched to the network terminal mode by the mode adjuster 5. In such mode, the ISAC circuit requires synchronous timing signals at its inputs DCL of 512 kHz, and 8 kHz on FSC 1 and FSC 2. From these signals, the ISAC circuit delivers the same synchronization and bit synchronization timing signals for the ISDN interface.

Module 3 for timing signal generation derives a timing signal from the arrival times of the blocks from the master apparatus. From this timing signal, module 3 produces, in accordance with the well known working principles of a PLL, a timing signal 512 kHz and therefrom, through division, a timing signal of 8 kHz. These timing signals are delivered to the corresponding inputs of the ISAC circuit of all interface modules 1.

From the 8 kHz signal a further symmetrical timing signal is generated in module 3 and delivered to one input of PIO 92.

Microcomputer 66, ISAC switching network in interface module 1, and the SIO in interface module 2, function in a similar manner as in the master apparatus together in the further transfer of the B and D channel data between the ISDN interface and the X channel.

Advantageously, arrangements for protocol conversion can be constructed from discretely elements as well as an interface module 1 or with several interface modules 1. A mode switch 5 then supplies an additional switching function for the operation of signal arrangements for protocol conversion autonomously or the allocation and the common operation of selected arrangements for protocol conversion.

In accordance with the process and apparatus of the invention it is possible to transmit the many faceted services of the ISDN over the appropriate interfaces, parallel in accordance with the ISDN channels, over large distances without transfer to another net. Thus it is possible to remain in the utilized ISDN net whereby the quality of the transfer services is not affected.

SUMMARY OF THE INVENTION

The invention relates to a process and apparatus for the enlargement of the reach of a transmission channel between functional groups of the ISDN user interface. With reference to one or more ISDN interfaces as they are, for example, standardized according to CCITT L400/ISDN user network interface and I.430/basic user network interface. Hereby it is possible to transmit many facet services of the ISDN over large distances. The process according to the invention occurs in such a manner that:

a) the data transmission from the net occurs in such a fashion that the ISDN specifically coded data arriving at the particular ISDN interfaces are converted with a code converter into binary coded data, separated in accordance with B and D channel information; and b) forming, byway of a storage device, blocks in the B and D channels (enhanced with a marker for the particular interface) and transmitting by transmission means within fixed time intervals (derived from the ISDN specific timing) to a receiver side the data with a bit timing determined either from an independently produced timing signal or a timing signal derived from the ISDN specific timing; and c) providing at the receiving points of the terminals an ISDN specific timing recovery (necessary for the communication between sender and receiver) which is derived either from the time spacing of the received data blocks or the time spaced arrival of the transmitted data bits; and d) storing the received blocks, in accordance with their markers, in a storage device, adapted to the particular ISDN interface and for transmission thereto, and the B channel information and the D channel information (insofar as present) is provided to a code converter in accordance with the derived timing and e) data transmission from the terminal side takes place in accordance with process steps a), b), wherein the ISDN specific timing described in process step b) is that timing which is recovered in process step c); and f) storing the received data blocks received at the net side in a memory in accordance with its marker and recovering the data byway of a code converter in accordance with the ISDN specific timing at the net side.

The apparatus comprises ISDN interfaces connecting arrangements, both on the terminal and net side, for protocol conversion and the equipment appropriate for the transmission channel and the transmission medium.

IN THE DRAWINGS

Further exemplary embodiments of the invention are illustrated in the attached drawings in which.

DETAILED DESCRIPTION

Figure 1:
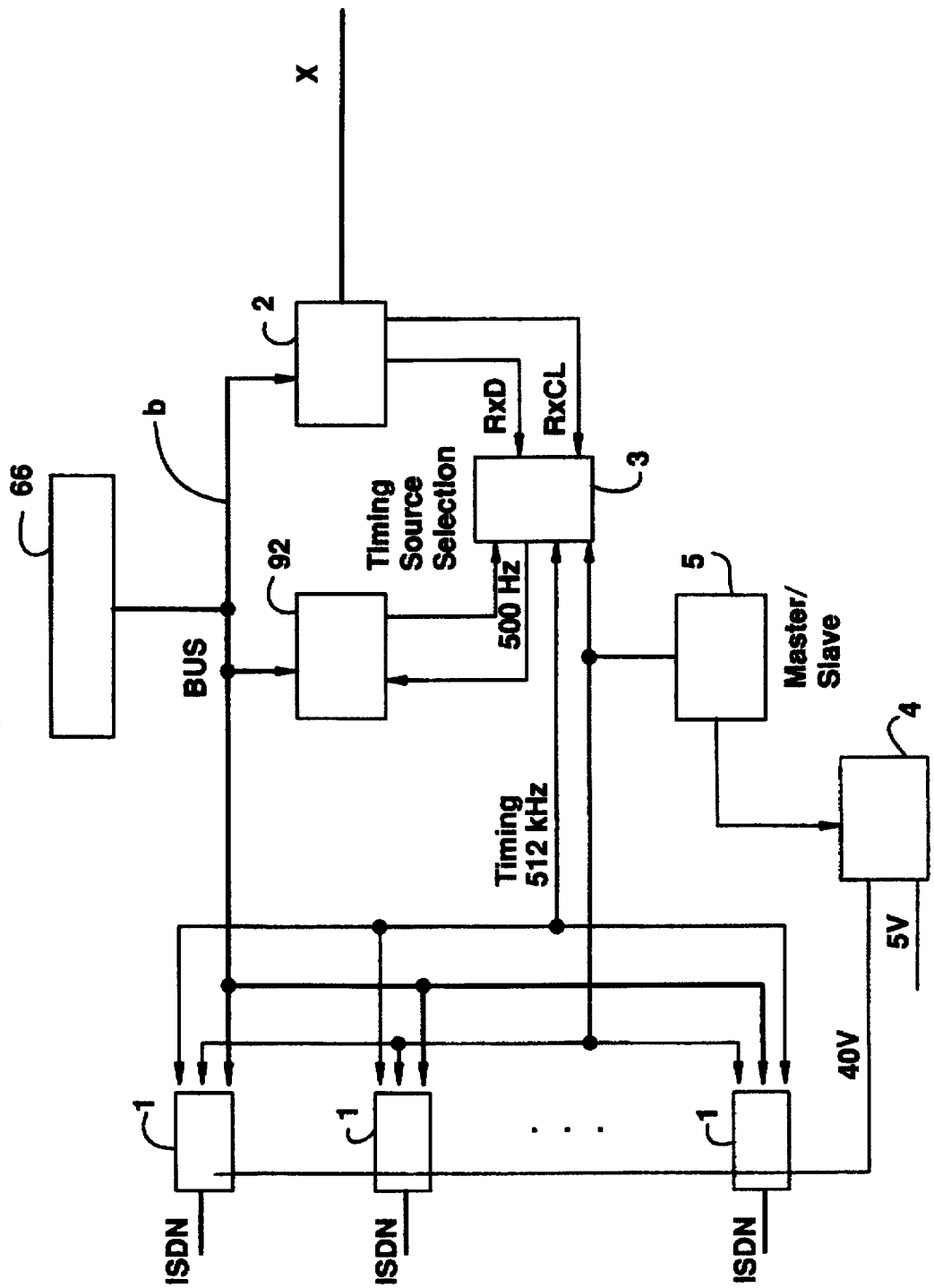
FIG. 1 shows a functional block diagram of an arrangement for protocol conversion.

Microcomputer 66 is comprised of a microprocessor (realized as an N80C188XL-20), a ROM for the storage of the program code, a RAM as working memory and a bus.

The microcomputer is connected with an SIO circuit (configured as a SAB82532) in interface module 2, with a PIO building element functionally created within SAB 82532, as well as with an ISAC circuit (realized as a PEB 2086) within interface module 1. The processor in microcomputer 66 controls the circuits PIO 92, PEB 2086 and SAB82532 through appropriate switching of the registers provided for these purposes in these building blocks. At the same time the processor interrogates these building blocks over these registers about the condition of them and exchanges data with them.

The activation/de-activation of the ISDN interface is controlled through PEB 2086 and interface module 1. The condition of each ISDN interface can be read from the registers of PEB 2086. The processor in microcomputer 66 periodically interrogates the registers of PEB 2086 to note the condition of the respective ISDN interface. The arrangement in FIG. 1 functions in master mode on the net side as follows:

Interface module 1 converts, in each direction, the signal levels of the ISDN interface to the levels required by circuit PEB 2086.

By way of the mode switch 5 the building blocks PEB 2086 of all interface module 1 are switched into the terminal mode. In this mode, PEB 2086 produces a timing signal of 512 kHz at its output DCL. When the ISDN interface is active, the timing signal of 512 kHz is derived synchronously from the bit timing of the ISDN interface.

The timing signal of 512 kHz of every interface module is provided to the module 3 for timing signal generation. The processor of microcomputer 66 determines the interface module 1 with the lowest logical address of the ISDN interface which is active. The timing signal 512 kHz from PEB 2086 of exactly this ISDN interface is utilized, through control of the microcompressor, in the module 3 for timing generation to achieve, through division, a symmetrical timing signal of 500 Hz.

The 500 Hz signal is delivered to a port of PIO 92 of microcomputer 66.

PEB 2086 in interface module converts the ternary coded B and D channel signals of the ISDN interface (insofar as it is active), into binary coded signals and stores these, byte by byte, in its registers. In the reverse direction, PEB 2086 converts the incoming binary coded B and D channel signals from microcomputer 66 into ternary signals and sends these data to the interface of the interface module 1 for delivery to the appropriate ISDN interface.

Through a register PEB 2086 indicates that it is ready for the transfer of a new B1 and B2 channel bytes and simultaneously a complete B1 and B2 channel byte from the processor. The processor of microcomputer 66 periodically interrogates the signaling register of PEB 2086 and either receives, or delivers, the formed B channel bytes in its working register.

Through a further register, PEB 2086 signals when a D channel frame has been received from the ISDN interface. The processor periodically interrogates these signaling bytes and accepts the D channel frame in its working memory.

If the processor has received a D channel frame from its opposite part, it transmits these bytes to PEB 2086 for further delivery to the ISDN interface.

The processor of microcomputer 66 builds blocks from the bytes received from PEB 2086 and stores these in its working RAM.

The processor in microcomputer 66 will always received an interrupt signal from PIO 92 when the timing input 500 Hz of PIO 92 changes its signal value. With every such signal, the first part of a new block is transmitted to the SAB82532 in interface module 2 and then a control register in SAB82532 is set whereby this building block is directed to begin the transfer of this block. SAB82532 indicates in a known register when the next part of the block must be transmitted so that the transmission does not break off. The processor periodically interrogates this register and delivers the further sections of the block to SAB82532.

The processor in microcomputer 66 transmits to SAB82532 in interface module 2 blocks in a continuing sequence corresponding to the cyclically read logical addresses of the ISDN interfaces. All active ISDN interfaces operate synchronously on the basis of the central timing of the ISDN so that the blocks are also produced synchronously.

When the ISDN interface is not active, the processor in microcomputer builds equal blocks of fixed length and transmits these instead of the data blocks.

In the opposite direction, SAB 82532 in interface module 2 receives bit serial data over the interface in interface module 2. When a first portion of a new block, or a further portion of a block are received in SAB82532, appropriate signaling bits are set in a register of SAB82532. The processor of microcomputer 66 periodically interrogates this register. When the receipt of a block is indicated, the processor accepts this block in sections in its working RAM. The blocks are ordered and stored in accordance with the logical address coded into the control bytes. The two most recently received blocks are temporarily stored per logical address.

The B channel bytes in the stored blocks are delivered with an average delay of (2xn×16) bytes, with reference to the time of their arrival, to the PEB 2086 in interface module 1 corresponding to the designated logical address of the blocks and the interface module.

PEB 2086 in interface module signals over internal registers that a B channel byte is ready for transfer to PEB 2086 for transmission to the ISDN interface. The processor of microcomputer 66 periodically interrogates the registers of all PEB 2086 units and then transfers the corresponding B-bytes to PEB 2086.

The D channel bytes of the blocks received by interface module 2 are transferred to the known D channel registers of PEB 2086 in interface module 1.

When the D channel frame is complete or a section of 32 D channel bytes is transferred, the processor arranges the transfer of the bytes through PEB 2086 to the ISDN interface by setting a proper register in PEB 2086.

On the terminal side the arrangement of FIG. 1 operates in slave mode as follows:

The conversion in either direction of the signal levels from the ISDN interface to the signal levels needed by building block PEB 2086 occurs in the interface module at the ISDN interface.

The mode switch 5 switches building block PEB 2086 in interface module 1 into the network terminal mode. In this mode, PEB 2086 requires synchronous timing signals at the input DCL of 512 kHz, and 8 kHz at FSC 1 and FSC 2. From these, PEB 2086 delivers the frame and bit synchronization signals for the ISDN interface.

Module 3 for timing signal generation derives a timing signal of 1 kHz from the sequence of arrival of the blocks from the master unit. From this timing signal, module 3, working in accordance with known principles of a phase locked loop, produces a timing signal of 512 kHz and therefrom through division, a timing signal of 8 kHz. These timing signals are delivered to the corresponding inputs of the PEB 2086 of all interface modules 1.

From the 8 kHz signal module 3 further delivers a timing signal of 500 Hz and delivers it one of the inputs of PIO 92.

Microcomputer 66, PEB 2086 in the interface module 1, and SAB82532 in the interface module 2 function in similar ways as in the master unit in the further transfer of the B and D channel data between the ISDN interface and the X channel.

The power supply for the apparatus produces for a connected TE without its own power supply a DC voltage of 40 volts which is transferred over the ISDN interface to the TE.

The blocks formed by the processor in microcomputer 66 have the following structure:

In the arrangement for protocol conversion every interface module 1 utilizes a switching network of PEB 2086 for the coupling between the ISDN interface (S/T-reference point) and bus (b).

At every active ISDN interface there are sent, as well as received, four frames of 48 bits per millisecond at a bit transmission rate of 192 kHz. Four frames contain:

64 bits channel B1
64 bits channel B2
16 bits channel D.

These data are stored in corresponding internal registers of PEB 2086 in interface module by byte and sorted in accordance with the channels so that they can be read by microcomputer 66 over the bus (b).

On the D channel of the ISDN, HDLC frames are transmitted. PEB 2086 stores only those D channel bytes which have been received within a D channel frame.

For transmission over the X channel, microcomputer 66 forms a block in n milliseconds in parallel (time multiplex) for every interface module 1 and stores these in the working register (RAM). Per millisecond, a block is created of 8 B1 bytes and 8 B2 bytes.

For example:

B1.1|B2.1|B1.2|B2.2|B1.3|B2.3|B1.4|B2.4|B1.5|B2.5|B1.6|B2.6|B1.7|B2.7|B1.8|B2.8

These blocks (hereafter characterized as GB) are sequentially, arranged in accordance with the number n of the interface modules utilized and an enhanced, insofar as available, by 2xn D bytes. Preceding is a control byte S in which the logical channel and the possible beginning of a D channel frame is encoded.

Block structure:

S|GB1|GB2|GB3|. . . |GBn|D1. . . |Di|Di+1|. . .|Dj

The number i+j of the D bytes is maximally 2xn and greater than 0, when D frames are to be transmitted. S is a steering byte in which the logical address of the interface module, as well as the value i, is encoded so that it shows that Di is the last byte of the preceding D frame and Di+1 the first byte of a following new D frame.

Flags (at least one flag) is transmitted between the blocks as separators.

Thus, the X channel must have a transmission rate in both directions of at least [18×n+1]×8 kbits/s.

In the arrangement connected to the net side every PEB 2086 is programed in the TE mode and thus delivers a timing signal of 512 kHz which is derived synchronously from the bit transmission rate of the ISDN interface and synchronously for the system timing of the ISDN. From one these timing signals the control module derives a synchronous timing signal of 1 kHz and n×160 kHz.

The data blocks are delivered on the X channel to the units connected on the participants side synchronously with the 1 kHz timing signal.

The transmission can occur either
a) with a bit timing signal from the transmission arrangement or
b) with a timing signal of nx160 kHz arranged in the unit. This can be determined by a switch.

In the arrangement on the participant's side for the protocol conversion, every PEB 2086 is programmed in the NT mode and thus requires therewith synchronous timing signals of 512 kHz and 8 kHz. These timing signals can be derived either from the time spaced succession of the blocks or, insofar one works with the bit transmission timing in accordance with (b), derived from the received bit timing by way of a PLL. These timing signals are synchronous with the 512 kHz timing signals in the arrangement connected to the net side. PEB 2086 forms from these signals the ISDN frame timing signal of 4 kHz at a bit timing of 192 kHz. Thus, the synchronicity of the ISDN units on the participant's side with the ISDN is assured.

The data blocks of the above described structure are transmitted on the modem channel in both directions in accordance with the sequence of their formation. The received blocks are stored in the working memory. The B and D channel bytes of the blocks are transmitted in accordance with logical number of the blocks from the storage to the register provided therefor in PEB 2086 of the appropriate interface module 1. PEB 2086 transfers these data to the ISDN interface in accordance with the timing and frame structure.

When the ISDN interface is not active, the processor in microcomputer 66 forms equal length blocks of a fixed length with the following structure:

S-Byte (Channel)|ISAC-S-Condition Byte|ISAC-S-Condition Byte|. .|.|.|.|.|.|.|.|

The S-byte signifies the logical channel. The condition byte is delivered from the circuit of PEB 2086 and indicates the condition of the ISDN interface. The condition byte is repeated in the example and the block is filled out with 9 bytes. The 6 bytes for filling do not carry any relevant information.

To assure the certain differentiation of the flags (01111110), during block transfer, from the information bytes, a "0" is inserted in the bit stream where more than five "1" follow one another. This results in an increase in the real required bit rate. To reduce the probability of this occurrence the blocks are connected, prior to transmission, through an exclusive OR with the bytes sequence 0×55, 0×AA, . . . .

Figure 2:
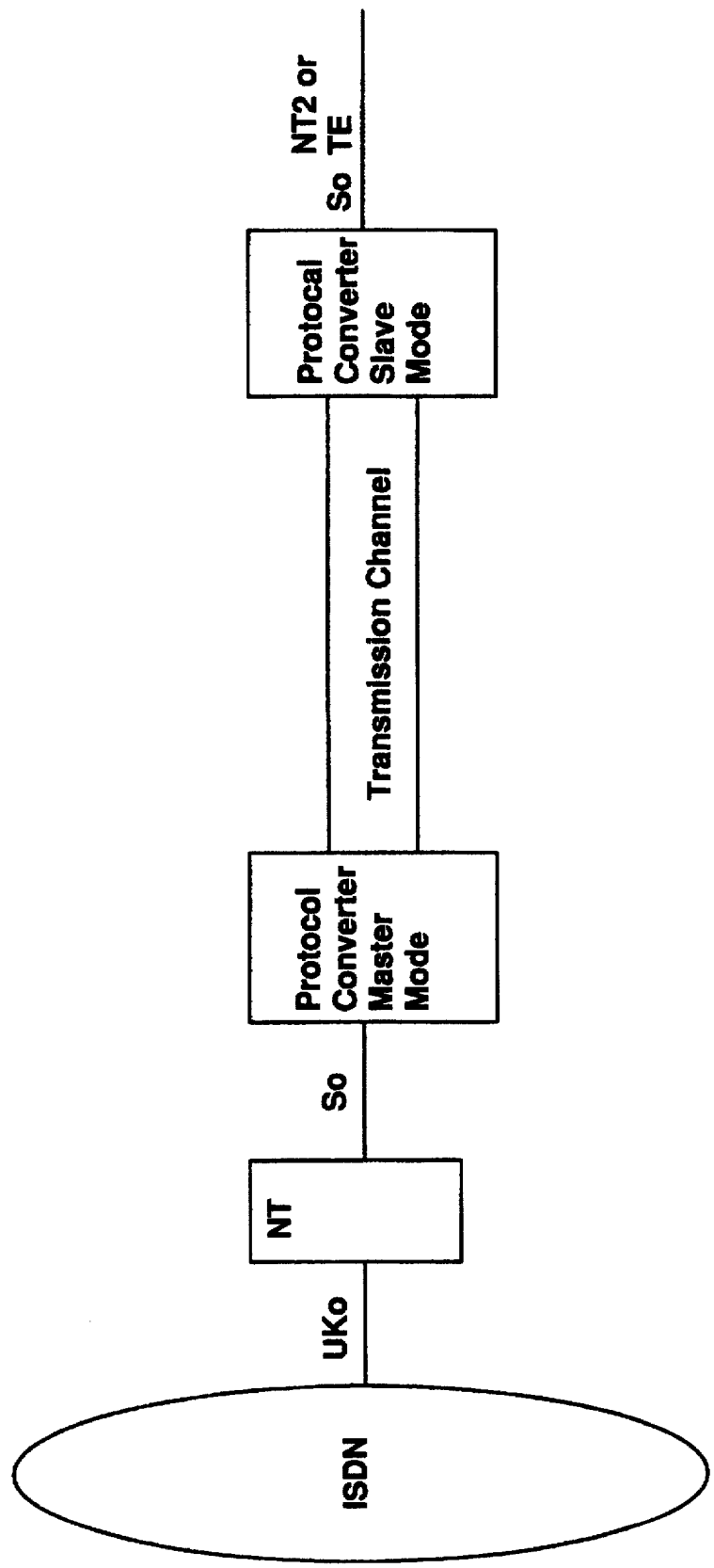
FIG. 2 shows and arrangement for the extension of the reach of a transfer channel between functional groups of an ISDN user interface.
Figure 3:
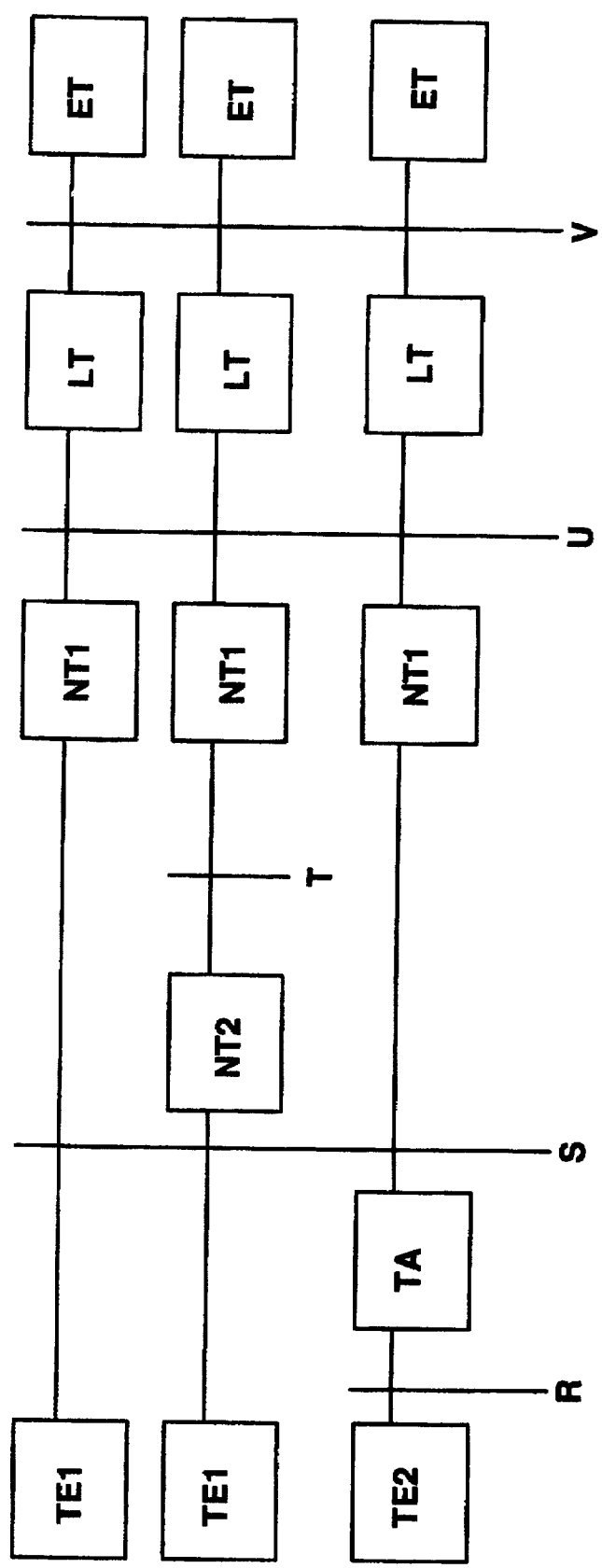
FIG. 3 shows a block diagram of one arrangement for protocol conversion.

FIG. 2 shows an arrangement for the enlargement of the reach between functional units of ISDN participant connections, with reference to an $S_o$ interface. Emitting from an ISDN network, over an interface $U_{ko}$ to a network termination NT, a protocol converter is arranged on the net side at the $S_o$ interface which communicates over the transmission channel with an arrangement for protocol conversion on the terminal side and which prepares the interface $S_o$ on the terminal side. On the terminal side one can drive an NT 2 unit or TE units directly.

The apparatus connected to the $S_o$ interface on the net side functions in master mode and the apparatus connected to $S_o$ interface on the terminal side functions in slave mode. The unit operating in master mode behaves, with respect to the ISDN net, like a terminal equipment TE and the unit working in slave mode appears as an NT network termination.

Between the two units connected over the transmission channel for protocol conversion (PW) the data exchange proceeds by way of bit serial synchronous transmission of data blocks of 16B channel bytes plus, at most, 2D channel bytes.

The arrangement for protocol conversion PW in master mode activates the $S_o$ interface always when it is not active. It transmits blocks only when the $S_o$ interface is active.

The arrangement for protocol conversion PW in slave mode activates the $S_o$ interface when this interface is not active and the unit receives data blocks at the same time from the master unit. The arrangement de-activates the $S_o$ interface when no blocks have been received from the master unit for one second.

What is claimed is:

1. Process for the enlargement of the reach of the transmission channel between functional units of the ISDN user interface within an ISDN network with one or more similar interfaces, in which information is exchanged between a netside user interface and a terminal side user interface and where the netside user interface and the terminal side user interface both have a transmitting side and a receiving side wherein the information has an ISDN-specific structure and is coded in an ISDN specific, non-binary, code and wherein an ISDN protocol fixes a certain time interval within which the connection between two users is not established with the absence of a signal in that time interval characterized by i) accumulating on a transmitting side the information in a memory after conversion of the ISDN specific coded information to binary coding, ii) transmitting the accumulated information over a transmission channel to a receiving side in a binary coded form, and iii) receiving the transmitted accumulated information at the receiving side, then storing the information in a memory from which the binary coded information is coded back to an ISDN specific code whereby the information is delivered to the user interface without violation of the time interval.

2. Process according to claim 1 wherein the information accumulated according to step i) occurs in blocks marked for a particular interface and separated into B and D channel information.

3. Process according to claim 2 wherein the blocks have equal lengths and the B channel and D channel information are apportioned in proportion to the capacities of the B and D channels.

4. Process according to claim 2 characterized in that the blocks formed are connected with a byte of changing bit value through an exclusive OR process.

5. Process according to claim 1 wherein the storage in memory according to step iii) occurs in blocks marked for a particular interface and separated into B and D channel information, and wherein a user interface is advised that a connection has not yet been established when the transmission delay over the transmission channel exceeds the ISDN standardized signal delay of the D channel.

6. Process according to claim 5 wherein the blocks have equal lengths and the B channel and D channel information are apportioned in proportion to the capacities of the B and D channels.

7. Process according to claim 5 wherein the storage in memory according to step iii) occurs in accordance with a fixed ISDN timing.

8. Process according to claim 7 wherein the fixed ISDN timing is derived from the time spaced succession of the received information blocks.

9. Process according to claim 7 wherein the fixed ISDN timing is derived from an ISDN specific timing signal.

10. Process according to claim 1 wherein the transmission of the accumulated information according to step ii) occurs sequentially with a timing derived from the ISDN specific timing of a particular interface.

11. Apparatus for the enlargement of the reach of the transmission channel between functional units of the ISDN user interface within an ISDN network with one or more similar interfaces, in which the information is exchanged between a netside user interface and a terminal side user interface and where the netside user interface and the terminal side user interface both have a transmitting side and a receiving side wherein the information has an ISDN-specific structure and is coded in an ISDN specific, non-binary code and wherein an ISDN protocol fixes a certain time interval within which the connection between two users is not established with the absence of a signal in that time interval characterized by:

i) means for accumulating the information, on a transmitting side, in a memory after conversion of the ISDN specific coded information to binary coding, ii) means for transmitting the accumulated information over a transmission channel in binary coded form to a receiving side, and iii) means for receiving the transmitted information accumulated at the receiving side, and storing the transmitted information in a memory from which the information is coded back to ISDN specific coded data thereby allowing delivery of the information to the user interface without violation of the time interval.

12. Apparatus according to claim 11 further including means for arranging the information accumulated at the transmitting side into blocks marked for a particular interface and separated into B and D channel information.

13. Apparatus according to claim 12 further including means for forming the blocks into equal lengths and apportioning the B channel and D channel information in proportion to the capacities of the B and D channels.

14. Apparatus according to claim 11 further including means for arranging the information for storage in memory at the receiving side into blocks marked for a particular interface and separated into B and D channel information.

15. Apparatus according to claim 14 further including means for forming the blocks into equal lengths and apportioning the B channel and D channel information in proportion to the capacities of the B and D channels.

16. Apparatus according to claim 14 further including means for storing information in memory at the receiving side in accordance with a fixed ISDN timing.

17. Apparatus according to claim 16 further including means for deriving the fixed ISDN timing derived from the time spaced succession of the received information blocks.

18. Apparatus according to claim 17 further including a PLL loop for deriving the fixed ISDN timing.

19. Apparatus according to claim 16 further including means for deriving the fixed ISDN timing from an ISDN specific timing signal.

20. Apparatus according to claim 11 further including means for the accumulation of information in memory on the transmitting side in accordance with a fixed ISDN timing.

* * * * *